United States Patent [19]

Ogle

[11] 3,857,392

[45] Dec. 31, 1974

[54] INTRAVENOUS CONTAINER WITH DISLODGEABLE SEPTUM AND DISLODGING PIERCER

[75] Inventor: Robert W. Ogle, Newport Beach, Calif.

[73] Assignee: IMS, Wilmington, Del.

[22] Filed: Nov. 1, 1972

[21] Appl. No.: 302,782

Related U.S. Application Data

[60] Continuation-in-part of Ser. No. 195,886, Nov. 4, 1971, which is a division of Ser. No. 830,311, June 4, 1969, Pat. No. 3,674,028.

[52] U.S. Cl. .................... 128/214 C, 128/DIG. 28
[51] Int. Cl. ............................................. A61m 5/16
[58] Field of Search .......... 128/272, 218 M, 214 C, 128/DIG. 28; 215/6; 206/47 A, 214 R, 214.2, 221; 222/80, 81, 82

[56] References Cited
UNITED STATES PATENTS

| | | | |
|---|---|---|---|
| 2,111,985 | 3/1938 | Meyer | 215/6 X |
| 2,377,274 | 5/1945 | Smith | 128/218 D X |
| 2,716,983 | 9/1955 | Windischman et al. | 128/221 |
| 3,092,106 | 6/1963 | Butler | 128/214 C |
| 3,316,908 | 5/1967 | Burke | 128/214 C |
| 3,464,414 | 9/1969 | Sponnoble | 128/DIG. 28 |
| 3,467,097 | 9/1969 | Ogle | 128/DIG. 28 |
| 3,489,147 | 1/1970 | Shaw | 128/218 M |
| 3,664,339 | 5/1972 | Santomieri | 128/214 C |
| 3,670,728 | 6/1972 | Dabney | 128/214 C |

FOREIGN PATENTS OR APPLICATIONS
1,071,557   3/1954   France .................. 128/214 C Primary Examiner—Richard A. Gaudet
Assistant Examiner—J. C. McGowan
Attorney, Agent, or Firm—Willis, Green & Mueth

[57] ABSTRACT

A device for the mixing and administration of intravenous fluid comprising a vial having an open end and a closed end, a dislodgeable septum intermediate the open and closed ends, an imperforate stopper in the open end, the vial being adapted to contain two liquids or a liquid and a dry material in separated state. A non-opaque drip meter is provided having a fluid outlet at one end and a fluid inlet, the inlet comprising a tubular member terminating within the drip meter whereby drops can be visually observed at the end of the tubular member through the drip meter. Extending from the drip meter is a hollow elongated rigid spike having an enlarged base adjacent the drip meter, the spike terminating in a scarf at its other end. The hollow interior of the spike communicates with the exterior through a filtered air inlet positioned in proximity to the base of the spike. A fluid passage runs through the base and has one end adjacent the spike at the exterior of the base and the other end communicates with the tubular member. The spike is adapted to puncture the stopper and dislodge the septum whereby the contents of the vial can be mixed without contamination from the exterior, and the fluid contents of the vial can flow through the fluid passage and the drip meter while filtered air passes through the hollow spike and is discharged within the vial above the fluid level within the vial.

7 Claims, 5 Drawing Figures

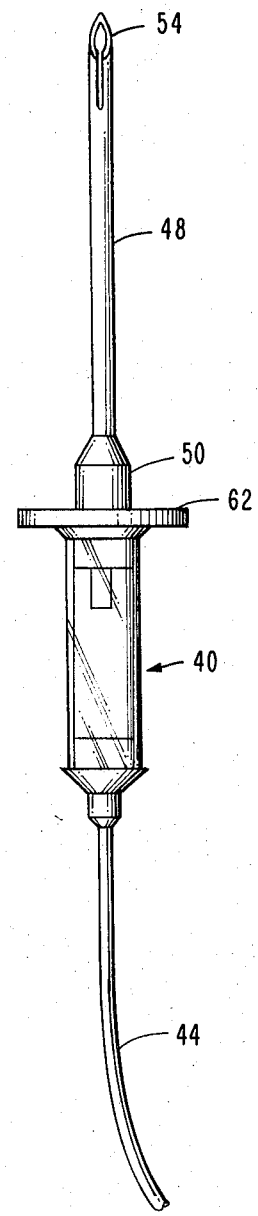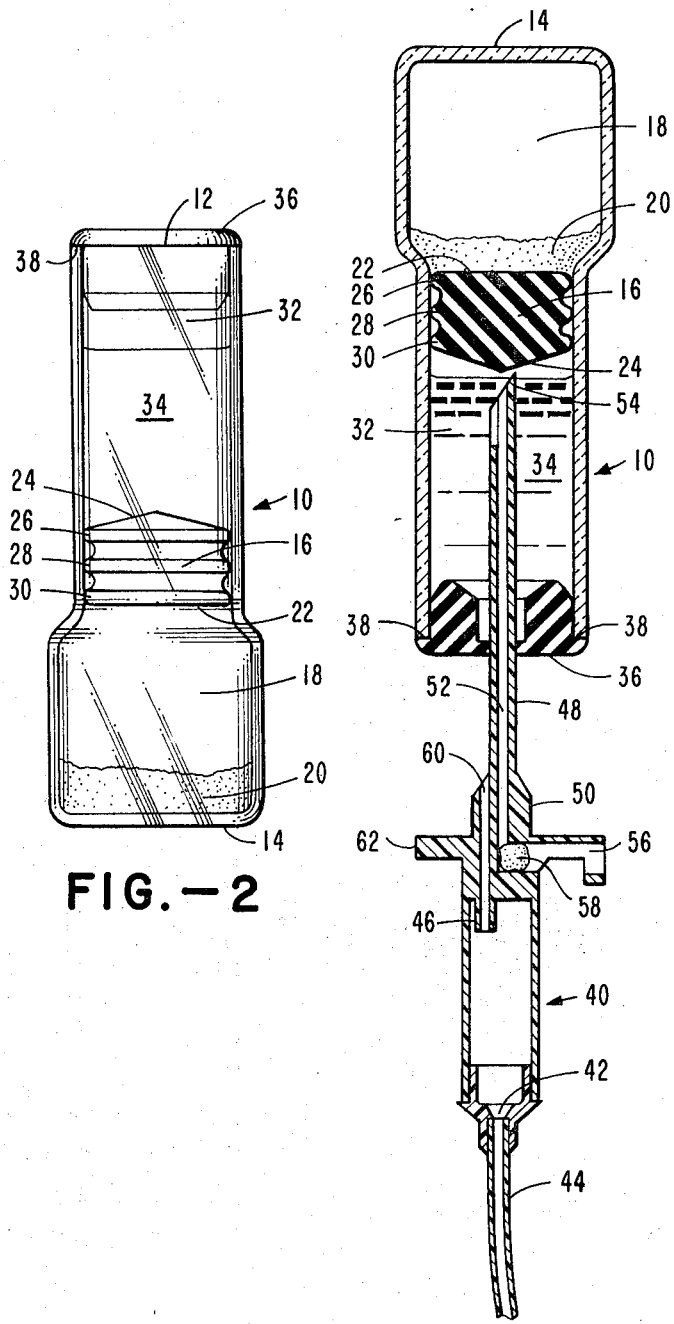
FIG.-1
FIG.-2
FIG.-3

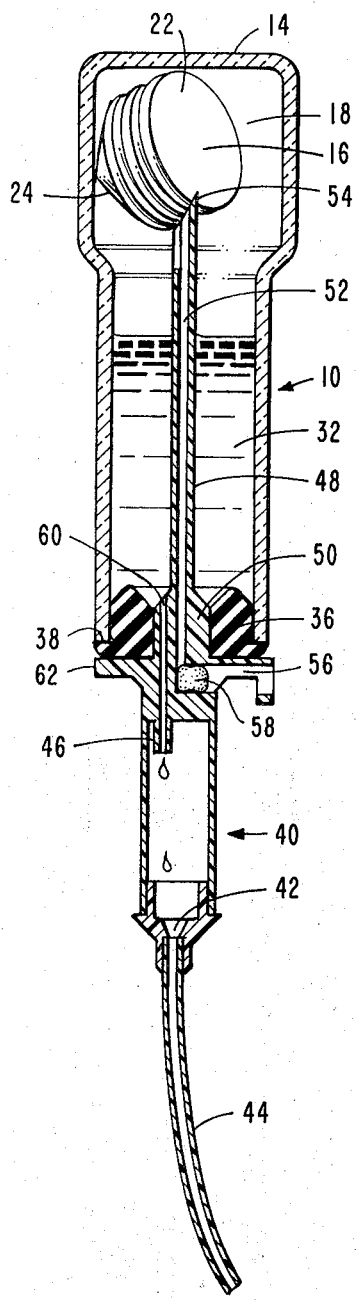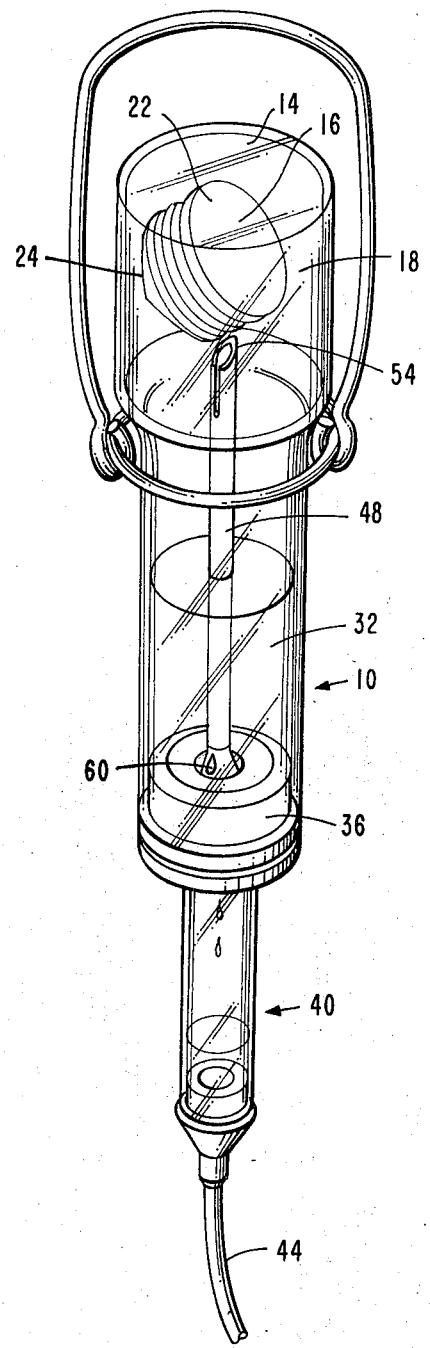
FIG.—4  FIG.—5

INTRAVENOUS CONTAINER WITH DISLODGEABLE SEPTUM AND DISLODGING PIERCER

This application is a continuation-in-part of application Ser. No. 195,886, filed Nov. 4, 1971, which was a divisional application of application Ser. No. 830,311, filed June 4, 1969 and now issued as U.S. Pat. No. 3,674,028.

BACKGROUND OF INVENTION

Various intravenous solution sets are known in the prior art. In general, these devices involve the drip meter assembly which has a sharp puncturing member at its upper end for piercing the stopper of a bottle of intravenous solution. The puncturing member normally has associated therewith, an air inlet and a fluid outlet. The air inlet provides for the discharge of air just inside the vial and well below the fluid level so that the air bubbles through the intravenous solution. This air, even though filtered, may contain bacteria and other contamination which is scrubbed from the air by the intravenous solution. The present invention is concerned with the elimination of the bubbling of air through the solution and the attendant risk of contamination. It is believed that this invention involves a major advance in the art of administering intravenous solutions.

SUMMARY OF INVENTION

Briefly, this invention comprises a novel device for the mixing and administration of intravenous fluid comprising a vial having an open end and a closed end, a dislodgeable septum intermediate said open and closed ends, an imperforate stopper in said open end, said vial being adapted to contain two liquids in a liquid and dry material in separated state, a non-opaque drip meter having a fluid outlet at one end and a fluid inlet, said inlet comprising a tubular member terminating within said drip meter whereby drops can be visually observed at the end of said tubular member through said drip meter, extending from said drip meter a hollow elongated rigid spike having an enlarged base adjacent said drip meter, said spike terminating a scarf at its other end, the hollow interior of said spike communicating with the exterior through a filtered air inlet positioned in proximity to the base of said spike, a fluid passage running through said base and having one end adjacent the spike at the exterior of said base and the other end communicating with said tubular member, said spike being adapted to puncture said stopper and dislodge said septum whereby the contents of the vial can be mixed without contamination from the exterior and the fluid contents of said vial can flow through said fluid passage and said drip meter while filtered air passes through said hollow spike and is discharged within said vial above the fluid level within said vial.

It is the object of my invention to provide a novel device for the administration of intravenous fluids.

More particularly, it is an object of this invention to provide a novel device which is adapted for the administration of intravenous fluids without the risk of contamination from air.

Another object of this invention is to provide a novel device for the packaging and administration of medicament for intravenous use which during storage is maintained in separated condition, viz, two liquids or a liquid and a dry material.

These and other objects and advantages of this invention will be apparent from the detailed description which follows.

DESCRIPTION OF PREFERRED EMBODIMENTS

Turning to the drawings:

FIG. 1 shows, in side view, one embodiment of the drip meter and hollow spike of this invention.

FIG. 2 shows, in side view, one embodiment of the vial, center septum and end stopper of this invention.

FIG. 3 shows, in sectional view, the parts of FIGS. 1 and 2 in partially assemnled condition.

FIG. 4 is a sectional view of the parts of FIGS. 1 and 2 in fully assembled condition.

FIG. 5 is a perspective view of the device shown in FIG. 4.

Considering the drawings in greater detail, the vial 10 has an open end 12 and a closed end 14. The center septum 16 is positioned just above the enlarged chamber 18 which contains a dry or lyophilized medicament 20. The septum 16 is flat on the side 22 facing the closed end 14 of the vial 10, and is centrally domed on the side 24 facing the open end 12 of vial 10. The septum 16 has three sealing rings 26, 28 and 30, which form a seal on the inside walls of the vial 10. A chamber 32 for liquid or diluent 34 is provided between septum 16 and the end stopper 36. The end stopper 36, unlike septum 16, is nonreciprocating. That is, it is not slidable downwardly within vial 10, such movement being prevented by shoulders 38 which overlay and may seal upon the ends of vial 10.

It is to be understood that this invention is applicable to vials which are cylindrical and/or which have no center septum. Such vials are normally used for non-reconstitutable medication. The vial may also be replaced by a conventional intravenous solution bottle or bag of the type already known and familiar to those skilled in the art.

The drip meter 40 has an outlet 42 provided with tubing 44 normally intended to carry the intravenous solution to the patient in conventional fashion. The drip meter 40 is normally non-opaque; that is, transparent or translucent so that drops of fluid may be observed and/or countered. The drip meter 40 has a fluid inlet comprising a tubular member 46 which terminates within the non-opaque drip meter. The hollow rigid spike 48 has an enlarged base 50 adjacent the drip meter 40. The spike 48 has a central opening 52, and a scarf 54 at one end. The opening 52 communicates with air opening 56. The opening 56 is normally provided with cotton 58 or other filtering material intended to entrap any airborne particulate matter of bacteria in the entering air. The fluid passage 60 runs through the base 50 and functions as a downcomer for fluid. The lower end of passage 60 communicates with the tubular member 46.

In use, the parts shown in FIGS. 1 and 2 are made up beginning as in FIG. 3 and concluding as in FIGS. 4 and 5 whereby the spike 48 dislodges the center septum 16 into chamber 18, allowing mixing and reconstitution to occur. The flange 62 is brought up flush with the exterior of stopper 36 so that passage 60 is in fluid communication with the fluid contents of the vial 10. The spike 48 is long enough to reach and dislodge septum 16 at or prior to the time the flange 62 is flush with stopper 36. In this way, the scarf 54 is above the initial fluid level in vial 10 when the parts are fully assembled. The air entering through passages 52 and 56 is discharged at scarf 54 above the fluid level.

Having fully described the invention, it is intended that it be limited only by the scope of the appended claims:

1. A novel device for the mixing and administration of intravenous fluid comprising a vial having an open end and a closed end, a dislodgeable septum intermediate said open and closed ends, an imperforate stopper in said open end, said vial being adapted to contain two liquids or a liquid and a dry material in separated state, a non-opaque drip meter having a fluid outlet at one end and a fluid inlet, said inlet comprising a tubular member terminating within said drip meter whereby drops can be visually observed at the end of said tubular member through said drip meter, extending from said drip meter a hollow elongated rigid spike having an enlarged base adjacent said drip meter, said spike terminating in a scarf at its other end, the hollow interior of said spike communicating with the exterior through a filtered air inlet positioned in proximity to the base of said spike, a fluid passage running through said base and having one end adjacent the spike at the exterior of said base so that essentially all of the fluid within said vial can drain out by gravity through said fluid passage, and the other end of said fluid passage communicating with said tubular member, said spike piercing said stopper and being adapted to dislodge said septum whereby the contents of the vial can be mixed without contamination from the exterior and the fluid contents of said vial can flow through said fluid passage and said drip meter while filtered air passes through said hollow spike and is discharged within said vial in the headspace above the fluid level within said vial.

2. The device of claim 1 wherein said spike is centrally disposed within said vial.

3. The device of claim 1 wherein said septum has a centrally domed surface facing said stopper.

4. The device of claim 1 wherein said drip meter has an external flange which abuts said end stopper.

5. The device of claim 1 wherein said end stopper is nonreciprocating.

6. The device of claim 1 wherein the vial has two chambers, the chamber adjacent said closed end being larger in diameter than the chamber adjacent said open end, said septum being positioned in the chamber adjacent said open end and being receivable under force applied by said spike in said chamber adjacent said closed end.

7. The device of claim 6 wherein said septum has a plurality of rings sealing on the walls of said vial.

* * * * *